United States Patent
Asai et al.

(12) 
(10) Patent No.: US 6,797,390 B2
(45) Date of Patent: Sep. 28, 2004

(54) FUNCTIONAL POLYMER WITH SUPPORTED PRESSURE-SENSITIVE LUMINOPHORE, AND PRESSURE-SENSITIVE PAINT AND PRESSURE-SENSITIVE ELEMENT USING SAME

(75) Inventors: Keisuke Asai, Chofu (JP); Hiroyuki Nishide, Tokyo (JP)

(73) Assignee: National Aerospace Laboratory of Japan, Chofu (JP)

( * ) Notice: Subject to any disclaimer, the term of this patent is extended or adjusted under 35 U.S.C. 154(b) by 6 days.

(21) Appl. No.: 10/386,671

(22) Filed: Mar. 13, 2003

(65) Prior Publication Data

US 2003/0175511 A1 Sep. 18, 2003

(30) Foreign Application Priority Data

Mar. 14, 2002 (JP) ........................................ 2002-070691

(51) Int. Cl.⁷ ................................................ B32B 9/04
(52) U.S. Cl. ....................... 428/446; 428/447; 526/241; 526/285; 436/138
(58) Field of Search ................................. 428/446, 447; 528/31, 34, 35; 436/138; 526/285, 241

(56) References Cited

U.S. PATENT DOCUMENTS 5,359,887 A   11/1994  Schwab et al.

FOREIGN PATENT DOCUMENTS

| JP | 11-37944 | 2/1999 |
| JP | 2001-249076 | 9/2001 |

OTHER PUBLICATIONS

Machine Translation, JP 2001–249076, Asai et al., Sep. 14, 2001.*

* cited by examiner

Primary Examiner—David J. Buttner
Assistant Examiner—Christopher Keehan
(74) Attorney, Agent, or Firm—Westerman, Hattori, Daniels & Adrian, LLP (57) ABSTRACT

An oxygen-quenching luminophore constituting part of a pressure-sensitive luminophore is directly bonded by a covalent bond to an organic polymer compound having trimethylsilyl groups, so the luminophore molecules are retained in the polymer and free aggregation is inhibited when the organic solvent is evaporated. It is therefore possible to prevent light response from being reduced by the aggregation of the luminophore molecules during evaporation of the organic solvent, which is a drawback of forming films from conventional mixed-type pressure-sensitive paints. A thin-film sensor with uniform characteristics can be formed by spraying or application from a pressure-sensitive paint obtained by mixing a functional polymer with a solvent. In addition, a coating solution that has high reproducibility and is suitable for spraying or application can be obtained merely by dissolving the functional polymer as a single component in a suitable solvent. It is possible to obtain a functional polymer, a pressure-sensitive paint, and a pressure-sensitive element in which a reduction in light response due to luminophore aggregation can be prevented, and a thin sensor film having uniform characteristics can be formed, even when the organic solvent has evaporated.

11 Claims, 7 Drawing Sheets

FUNCTIONAL POLYMER WITH SUPPORTED PRESSURE-SENSITIVE LUMINOPHORE, AND PRESSURE-SENSITIVE PAINT AND PRESSURE-SENSITIVE ELEMENT USING SAME

BACKGROUND OF THE INVENTION

1. Field of the Invention

The present invention relates to a functional polymer with a supported pressure-sensitive luminophore that has high pressure sensitivity and rapid response, such as the one that can be used, for example, in sensors for the optical sensing of oxygen; and to a pressure-sensitive paint and pressure-sensitive element featuring the same.

2. Description of the Related Art

In conventional practice, pressure-sensitive paints known as oxygen sensors are coating materials obtained by dissolving light-excitable substances having oxygen quenching properties in polyvinyl chloride, polystyrene, and other oxygen-transmitting resins. Oxygen sensors are produced by applying such paints to matrices, but the extent to which the light-excitable substances and oxygen are brought into contact with each other in such sensors depends on the phenomenon of oxygen diffusion in the resins, and the sensors are thus disadvantageous in the sense that their oxygen sensitivity depends on the temperature and that the temporal response in relation to pressure variations is inadequate. In addition, the oxygen permeability of such resins decreases in low-temperature environments, making the sensors much less sensitive and unsuitable for use in measuring the ultralow-pressure on the surfaces of objects or detecting the traces of oxygen in the high-altitude environment; for use in measuring the distribution of pressure on the surface of a specimen in a cryogenic wind tunnel; or the like.

For this reason, the inventors have previously proposed a method in which a porous film is formed on the surface of a sensor matrix, and a light-excitable substance is directly adsorbed and retained on the porous film in order to bring the light-excitable substance into direct contact with oxygen rather than disperse this substance in the resin, and also proposed a sensor obtained using this method (Japanese Patent Application Laid-open No. H11-37944). Although the sensor produced by this method is an exceptionally good product in the sense that high oxygen detection sensitivity can be ensured and the reduction in sensitivity at low temperatures is minimal, problems still remain because there are limits as to the materials suitable for forming porous films as sensor matrices, it is impossible to say which specimens would be better for conducting operations in which light-excitable substances are adsorbed on the porous films, and the like.

The inventors also proposed a highly functional pressure-sensitive paint in which poly[1-(trimethylsilyl)-1-propyne] (referred to hereinbelow as "poly(TMSP)") is used as a binder for the light-excitable substance (Japanese Patent Application Laid-open No. 2000-249076). A paint obtained by using poly(TMSP) as the binder and admixing a light-excitable substance thereto is an exceptionally good, highly functional pressure-sensitive paint in which not only can high pressure sensitivity and low temperature sensitivity be combined and the oxygen sensitivity preserved even at the temperature of liquid nitrogen, but good response to pressure variations can also be obtained and spray coating made possible as a result of the fact that the binder has high oxygen permeability, and this high permeability is independent of the temperature and remains high even at low temperatures.

However, even these high-performance pressure-sensitive paints still have drawbacks that need to be overcome, such as nonuniform characteristics of the thin films formed by application, and a reduction in photoresponsivity due to luminophore aggregation during the evaporation of organic solvents.

SUMMARY OF THE INVENTION

An object of the present invention is to obtain a one-component pressure-sensitive paint in which the reduction in response due to luminophore aggregation can be prevented and a thin sensor film having uniform characteristics can be formed by retaining the luminophore in the polymer even after the organic solvent has evaporated and the thin film formed.

The functional polymer with a supported pressure-sensitive luminophore obtained in accordance with the present invention contains an acetylene derivative in which trimethylsilyl groups are bonded and in which a pressure-sensitive luminophore having oxygen quenching properties is also covalently bonded.

The pressure-sensitive luminophore containing a sensor portion that has oxygen pressure sensing functionality as oxygen quenching properties in the functional polymer with a supported pressure-sensitive luminophore in accordance with the present invention is present in a covalently bonded state in the acetylene derivative, so the luminophore molecules are retained as part of the acetylene derivative even when the organic solvent evaporates, and free aggregation is inhibited. It is thus possible to prevent response from being reduced by the aggregation of luminophore molecules during the evaporation of organic solvents, which is a drawback of forming films from conventional mixed-type pressure-sensitive paints.

Trimethyl-1-silyl propyne can be copolymerized with the acetylene derivative in this functional polymer with a supported pressure-sensitive luminophore. Trimethyl-1-silyl propyne is used as a material for preventing steric hindrance in polymer compounds containing this acetylene derivative.

The acetylene derivative in the functional polymer with a supported pressure-sensitive luminophore may be 5-(4-trimethylsilyl ethynyl phenyl)-10,15,20-triphenyl platinum porphyrin. The functional polymer obtained by copolymerizing this substance with trimethylsilyl-1-propyne is poly[trimethylsilyl-1-propyne-co-5-(4-trimethylsilyl ethynyl)phenyl-10,15,20-triphenyl platinum porphyrin].

The acetylene derivative in the functional polymer with a supported pressure-sensitive luminophore may be trimethylsilylethynylpyrene.

A pressure-sensitive paint can be obtained by admixing the aforementioned functional polymer with a supported pressure-sensitive luminophore into a solvent. Specifically, not only can production be facilitated, but high function reproducibility can also be achieved because the product can be applied and formed into a film using a solution that is merely dissolved in a solvent without the addition of binders or other materials. Storage and transport are simplified by allowing the product to stand as a pressure-sensitive paint, and the pressure-sensitive paint can also be used as needed in the form of a thin layer on a substrate by spraying the paint with a spray, applying the paint with a brush, or employing various other means.

Furthermore, a pressure-sensitive element can be obtained by applying and solidifying the aforementioned pressure-sensitive paint on a substrate. A highly uniform sensor film can be formed as a pressure-sensitive element on a suitable substrate when the aforementioned pressure-sensitive paint is thus applied. Forming such sensor films on the surface of a wing or other specimen and measuring the pressure distribution on the wing surface in a wind tunnel test or a test involving an actual device can be cited as an application example for these films.

The functional polymer with a supported pressure-sensitive luminophore newly synthesized in accordance with the present invention contains a covalently bonded pressure-sensitive luminophore and polymer, making it possible to prevent the luminophore from aggregating during the evaporation of the organic solvent, and to use the polymer in the formation of a uniform pressure sensor film that has high photoresponsivity. The functional polymer according to the present invention can be merely mixed with a solvent without any binders, stored and transported in the form of pressure-sensitive paint, and used at any time for application and film forming. This functional polymer has a single component as a pressure-sensitive paint, and is thus a paint that can be readily applied by spray coating, dipping, casting onto a substrate, or another method. It is also possible to use the pressure-sensitive paint as a film formed on a substrate by spraying or application, and to obtain a pressure sensor of uniform thickness. The distribution of pressure on a wing surface (specimen) can be measured with high sensitivity and resolution even in an ultralow-pressure environment by employing the pressure sensor thus obtained in cryogenic wind tunnel tests or impact wind tunnel tests.

DESCRIPTION OF THE PREFERRED EMBODIMENTS

Synthesis Example 1

Figure 2:
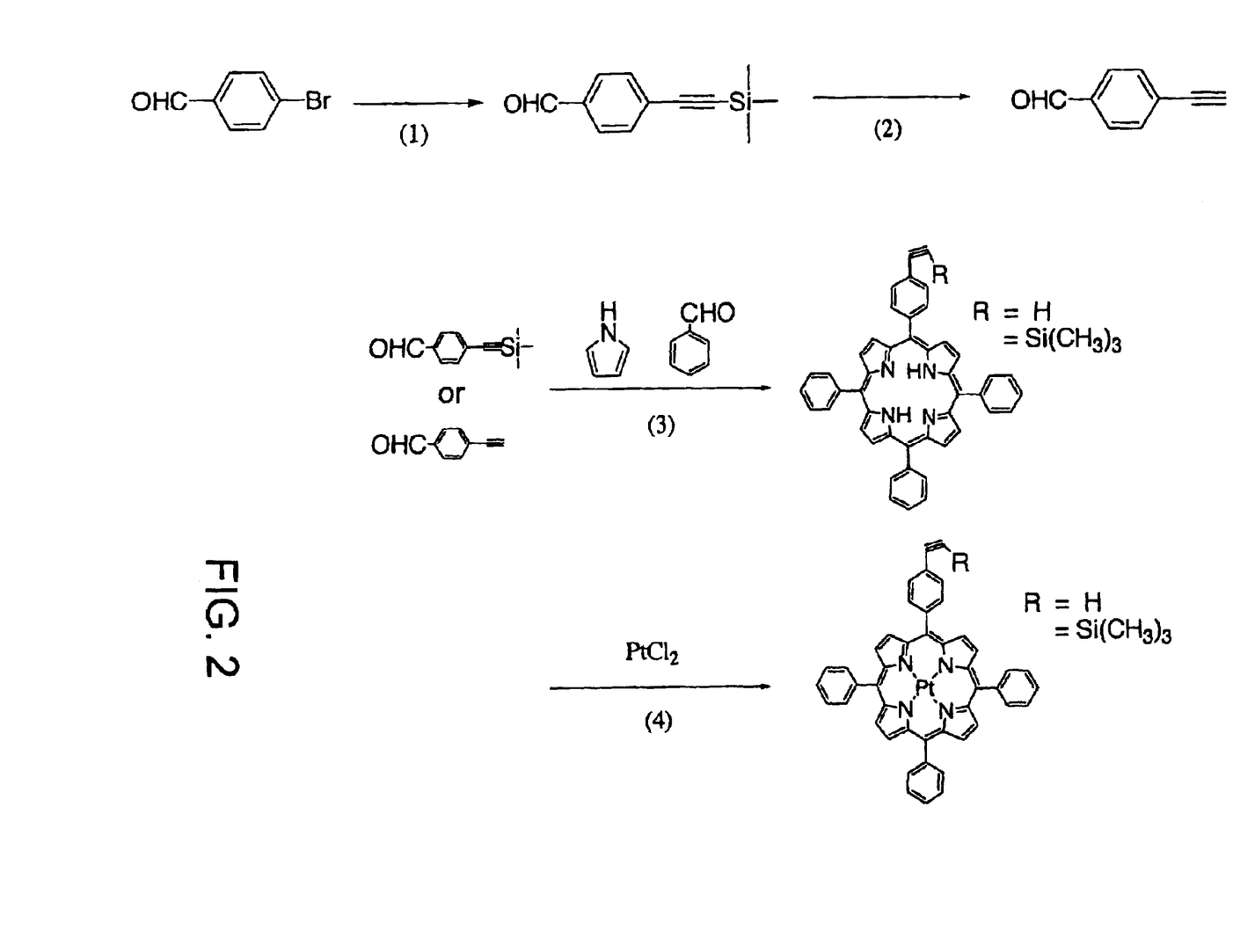
FIG. 2 is a diagram depicting the synthesis path of reactions (1) to (4) for the compound shown in FIG. 1.

An aldehyde having ethynyl groups was synthesized by a cross-coupling reaction using a palladium catalyst in accordance with reaction (1) in FIG. 2. Specifically, 8.4 g of 4-bromobenzaldehyde white crystals, 9.8 mL of trimethylsilyl acetylene, and 0.34 g of triphenylphosphine were dissolved in 100 mL of dried triethylamine, and the product was stirred under nitrogen gas. The system was heated to 80° C., 300 mg of tris(dibenzylidene acetone)dipalladium was added, and boiling-point reflux was conducted for 3 hours. The reaction mixture was allowed to cool to room temperature, and the resulting hydrogen bromide salt of triethylamine was filtered off and washed with hexane. The filtrate was concentrated at a reduced pressure, and the target product was separated using a silica gel column. Hexane was used as the eluant, and a component with an Rf of 0.38 was collected. The component was recrystallized from hexane, yielding yellow crystals with an aldehyde odor. A moiety of 75–80° C. was purified by distillation at a reduced pressure of 0.04 mm Hg, the product was recrystallized from isopropanol, and 4-trimethylsilyl ethynyl benzaldehyde was isolated as white crystals with the yield of 97%.

The 4-trimethylsilyl ethynyl benzaldehyde had the following characteristics.

Melting point: 67° C.; infrared absorption spectrum (2957 $cm^{-1}$: Si—CH stretching vibrations, 2156 $cm^{-1}$: C C stretching vibrations); $^1$H-NMR spectrum (0.25 (s, 9H, trimethylsilyl group), 7.60–7.80 (q, 4H, phenyl group), 9.99 (s, 1H, aldehyde group) ppm); mass analysis (m/e): 202 ($M^+$).

The trimethylsilyl groups were subsequently subjected to a deprotecting reaction in accordance with reaction (2) in FIG. 2. Specifically, 4.0 g of 4-trimethylsilyl ethynyl benzaldehyde was dissolved in 20 mL of methanol, the solution was stirred for 30 minutes under nitrogen gas, 0.19 g of sodium carbonate was added, and the product was stirred for another 3 hours at room temperature. The solvent was removed at a reduced pressure, the residue was washed with a 5% aqueous solution of sodium bicarbonate and extracted with dichloromethane, anhydrous sodium sulfate was added, and the product was dried. The dried product was filtered off and the solvent was removed at a reduced pressure. The product was dried in a vacuum, yielding the target compound 4-ethynyl benzaldehyde with an aldehyde odor as white crystals with the yield of 99%.

The 4-ethynyl benzaldehyde had the following characteristics.

Melting point: 89° C.; infrared absorption spectrum (3222 $cm^{-1}$: C CH stretching vibrations, 2101 $cm^{-1}$: C C stretching vibrations); $^1$H-NMR spectrum (3.29 (s, 1H, ethynyl group), 7.65–7.85 (q, 4H, phenyl group), 10.0 (s, 1H aldehyde group) ppm); mass analysis (m/e): 130 ($M^+$).

4-Trimethylsilyl ethynyl benzaldehyde or 4-ethynyl benzaldehyde benzaldehyde and pyrrole were allowed to react in accordance with reaction (3) in FIG. 2 to form porphyrin rings by the condensation of the pyrrole and aldehyde derivative. Specifically, 400 mL of chloroform was introduced into a shaded reaction container, and the following components were then added in sequence: 1.5 g of 4-trimethylsilyl ethynyl benzaldehyde or 0.95 g of 4-ethynyl benzaldehyde benzaldehyde, 3.2 mL of distilled benzaldehyde, 2 mL of distilled pyrrole, and 0.9 mL of a boron trifluoride/diethyl ether complex. The mixture was stirred for 1 hour at room temperature under nitrogen gas. A solution obtained by dissolving 5 g of p-chloranil in 100 mL of tetrahydrofuran was added, and the reaction solution was stirred for another 1.5 hours. The solution was concentrated, and the p-chloranil was filtered out. Dichloromethane/hexane=1:1 was used as the eluant, the product was purified using a silica gel column, and a purple porphyrin fraction was recovered. The eluant was further changed to dichloromethane/hexane=5/7, and the target product 5-(4-ethynyl phenyl)- and 5-(4-trimethylsilyl ethynyl phenyl)-10,15,20-triphenyl porphyrin was obtained as purple crystals with the aid of a flush column with the yield of 12%.

The 5-(4-trimethylsilyl ethynyl phenyl)-10,15,20-triphenyl porphyrin had the following characteristics.

Melting point: 300° C. or greater; ultraviolet visible absorption spectrum: 411, 509, 550, 594, 645 (m) (*2); $^1$H-NMR spectrum (−2.68 (s, 2H, imino group), 3.32 (s, 1H, ethynyl group), 7.80–8.10 (m, 19H, phenyl group), 8.90 (s, 8H, pyrrole ring) ppm); mass analysis (m/e): 711 ($M^+$+1).

The 5-(4-ethynyl phenyl)-10,15,20-triphenyl porphyrin obtained with the yield of 11% had the following characteristics.

Melting point: 300° C. or greater; ultraviolet visible absorption spectrum: 419, 515, 555, 591, 648 (nm); $^1$H-NMR spectrum (−2.83 (s, 2H, imino group), 0.25 (s, 9H, trimethylsilyl group), 7.80–8.10 (m, 19H, phenyl group), 8.83 (s, 8H, pyrrole ring) ppm); mass analysis (m/e): 639 ($M^+$+1).

Platinum was inserted into the porphyrin derivative in accordance with reaction (4) in FIG. 2. Specifically, 81 mg of platinum chloride was added under nitrogen gas to a solution containing 110 mg of 5-(4-trimethylsilyl ethynyl phenyl)-10,15,20-triphenyl porphyrin or 100 mg of 5-(4-ethynyl phenyl)-10,15,20-triphenyl porphyrin in 20 mL of benzonitrile, the mixture was heated to 160° C. and refluxed for 40 hours, and the benzonitrile was then removed at a reduced pressure and filtered. The unreacted platinum chloride was completely removed with the aid of an alumina column in which dichloromethane was used as the eluant, yielding, as tangerine-colored crystals, 5-(4-ethynyl phenyl)- and 5-(4-trimethylsilyl ethynyl phenyl)-10,15,20-triphenyl platinum porphyrin as purple crystals.

The 5-(4-trimethylsilyl ethynyl phenyl)-10,15,20-triphenyl platinum porphyrin obtained with the yield of 94% had the following characteristics.

Melting point: 300° C. or greater; ultraviolet visible absorption spectrum 408, 512, 539 (nm); $^1$H-NMR spectrum (0.18 (s, 9H, trimethylsilyl group), 7.75 (m, 12H, phenyl group), 8.14 (m, 8H, phenyl group), 8.73 (s, 8H, pyrrole ring) ppm); mass analysis (m/e): 904 ($M^+$).

The 5-(4-ethynyl phenyl)-10,15,20-triphenyl platinum porphyrin obtained with the yield of 85% had the following characteristics.

Melting point: 300° C. or greater; ultraviolet visible absorption spectrum 402, 510, 538 (nm); $^1$H-NMR spectrum (3.49 (s, 1H, ethynyl group), 7.75 (m, 12H, phenyl group), 8.14 (m, 8H, phenyl group), 8.73 (s, 8H, pyrrole ring) ppm); mass analysis (m/e): 831 ($M^+$).

Synthesis Example 2

Figure 3:
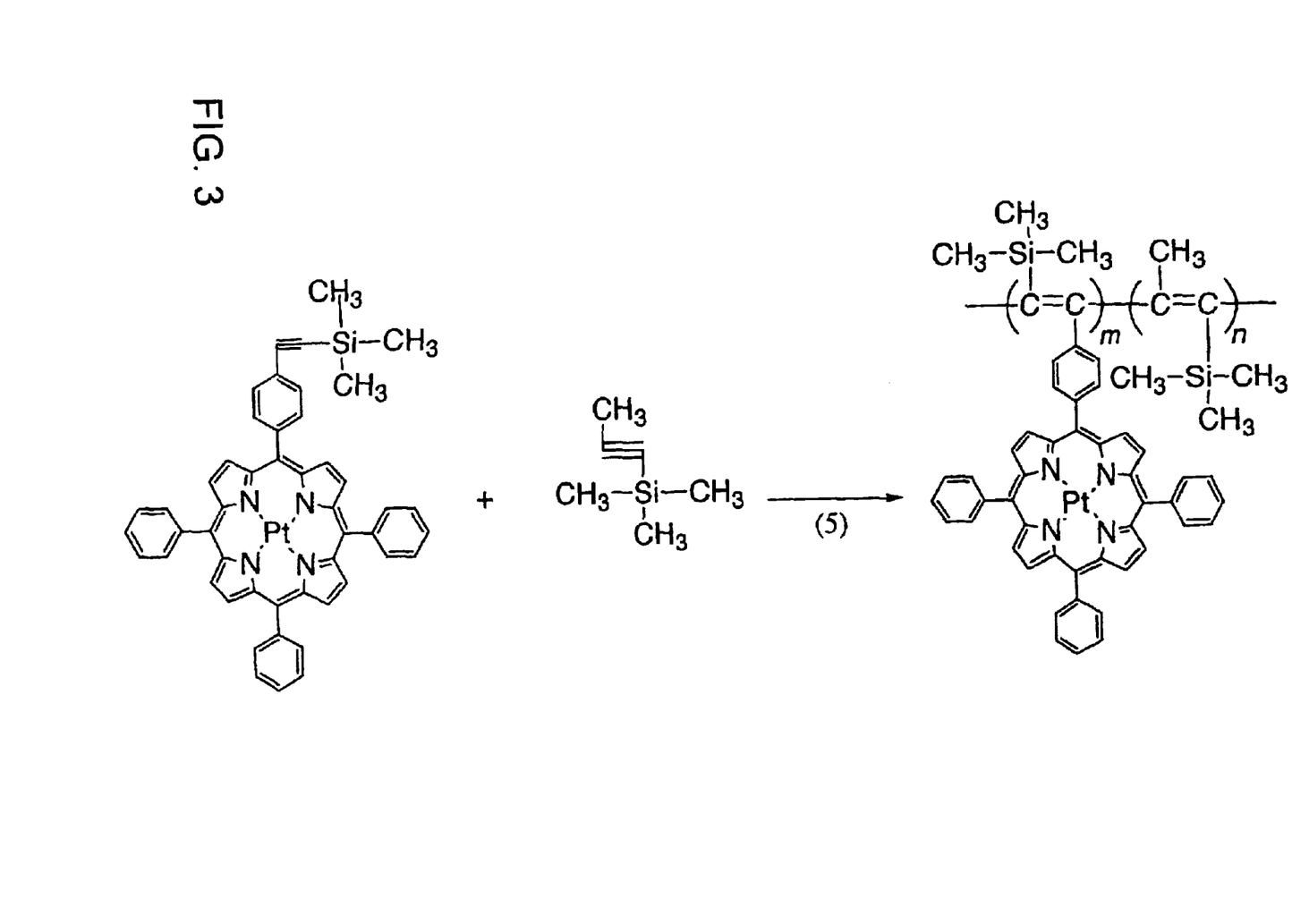
FIG. 3 is a diagram depicting the synthesis path of reaction (5) for the compound shown in FIG. 1.

5-(4-Trimethylsilyl ethynyl phenyl)-10,15,20-triphenyl platinum porphyrin and 1-trimethylsilyl-1-propyne (TMSP) were copolymerized using tantalum chloride as a catalyst in accordance with reaction (5) in FIG. 3. Specifically, 12 mL of toluene was introduced into a nitrogen-replaced reaction vessel, which was then purged with nitrogen gas for 30 minutes. 0.5 mL of TMSP was injected with a syringe, the nitrogen aeration was continued under heating, and the system was slowly heated to 90° C. over a period of 20 minutes. 80 mg of titanium chloride and, 30 minutes later, 80 mg of 5-(4-trimethylsilyl ethynyl phenyl)-10,15,20-triphenyl platinum porphyrin were added, and the system was heated to 90° C. and allowed to react for 1 day. A polymer settled out when the reaction solution was added in drops to 1 L of methanol under stirring. The precipitate was filtered off and dried. The product was re-dissolved in a small amount of toluene, and the catalyst-containing impurities were precipitated and removed by ultracentrifugation (24,000 rpm, 90 minutes). The transparent yellow toluene solution was poured into 1 L of methanol, and the precipitate was collected by filtration, yielding a lemon-yellow polymer with the yield of 47%.

The resulting polymer had the following characteristics.

Weight-average molecular weight: $6.0 \times 10^5$ (weight-average molecular weight/number-average molecular weight: 1.4); platinum porphyrin content: 0.1 mol % (0.8 wt % in terms of weight); infrared absorption spectrum (1560 $cm^{-1}$: C=C stretching vibrations, 1240 $cm^{-1}$: Si—C stretching vibrations); ultraviolet visible absorption spectrum: 317, 418, 510, 538 (nm); $^1$H-NMR spectrum (0.26 (s, trimethylsilyl group, 9H); 1.7–2.3 (br, methyl group, 3H) ppm).

Copolymerization with TMSP was conducted in the same manner as above except that 200 mg of 5-(4-trimethylsilyl ethynyl phenyl)-10,15,20-triphenyl was added.

The resulting compound obtained with the yield of 42% had the following characteristics.

Weight-average molecular weight: $4.30 \times 105$ (weight-average molecular weight/number-average molecular weight: 1.6); platinum porphyrin content: 0.3 mol % (2.5 wt % in terms of weight).

Figure 1:
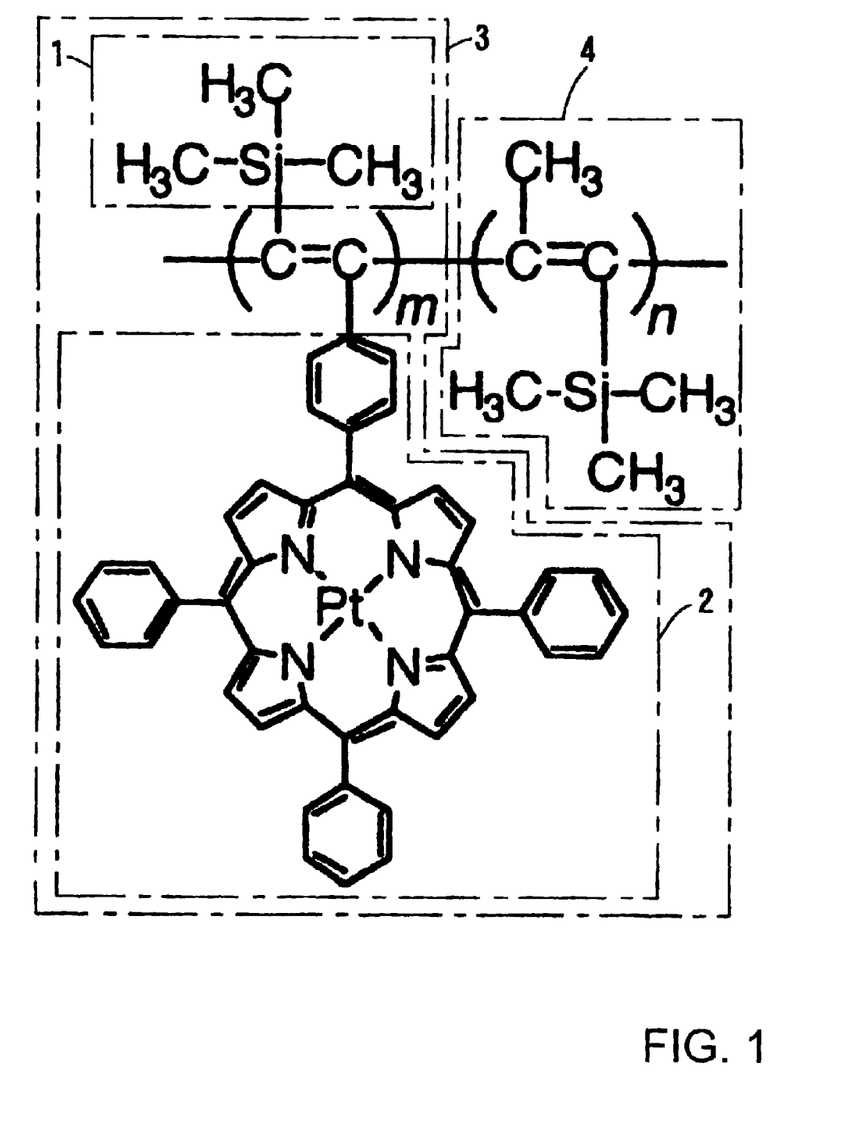
FIG. 1 depicts the structural formula of a novel substance according to the present invention.

The structural formula of poly[trimethylsilyl-1-propyne-co-5-(4-trimethylsilyl ethynyl phenyl)-10,15,20-triphenyl platinum porphyrin], which is the novel substance thus obtained, is shown in FIG. 1. In the figure, 1 is a trimethylsilyl group, 2 is a pressure-sensitive luminophore containing a platinum porphyrin derivative, 3 is an acetylene derivative bonded to trimethylsilyl group 1 and covalently bonded with pressure-sensitive luminophore 2, and 4 is trimethylsilyl-1-propyne.

Figure 4:
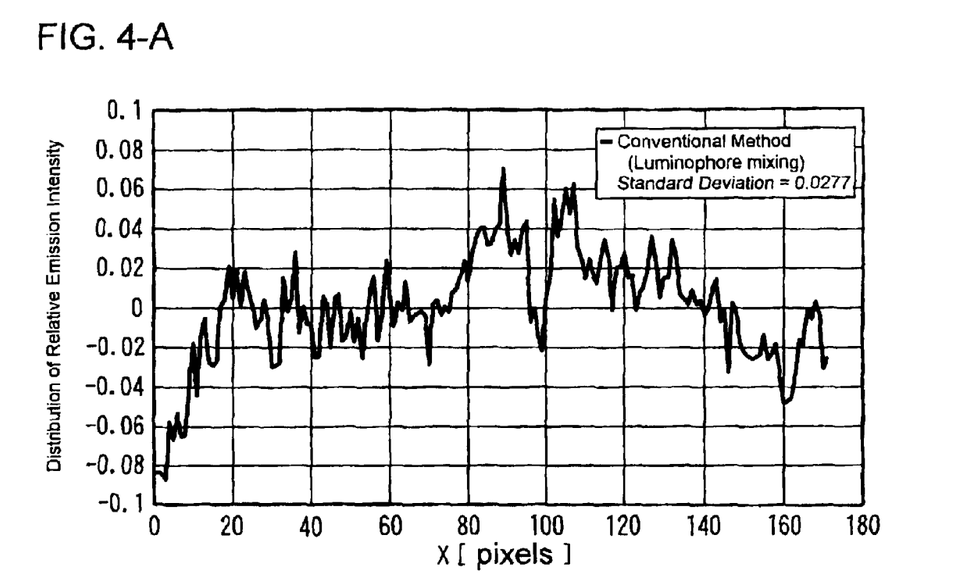
FIG. 4 is a graph comparing the film-forming uniformity of the novel compound obtained in accordance with the present invention and a conventional pressure-sensitive paint obtained by mixing a luminophore and a binder.

FIG. 4 is a comparison between the uniformity of thin-film characteristics of the novel compound obtained in accordance with the present invention and those of a conventional pressure-sensitive paint obtained by mixing a luminophore and a binder. FIG. 4-A in the top part is a graph depicting the film-forming uniformity of a paint based on a conventional luminophore mixture, and FIG. 4-B in the bottom part is a graph depicting the film-forming uniformity of the luminophore-supporting novel compound in accordance with the present invention. In both cases, toluene was used as the solvent, and the thin films were obtained by spraying the paint onto a substrate and allowing the organic solvent to dry naturally. The films were uniformly irradiated by a xenon lamp through a band-pass filter with a central wavelength of 400 nm, and the corresponding distribution of emission intensity was measured with a high-sensitivity cooled digital CCD camera through a band-pass filter with a central wavelength of 650 nm. The horizontal axis in the figure indicates positions (X) on samples of camera images, and the distribution of relative emission intensity on the vertical axis is shown as a deviation from the mean value. It can be seen that because the luminophore is retained in the polymer, the luminophore in the novel compound does not aggregate during drying, and the nonuniformity of the emission intensity distribution is reduced to 40% of that observed when the conventional method is employed.

Figure 5:
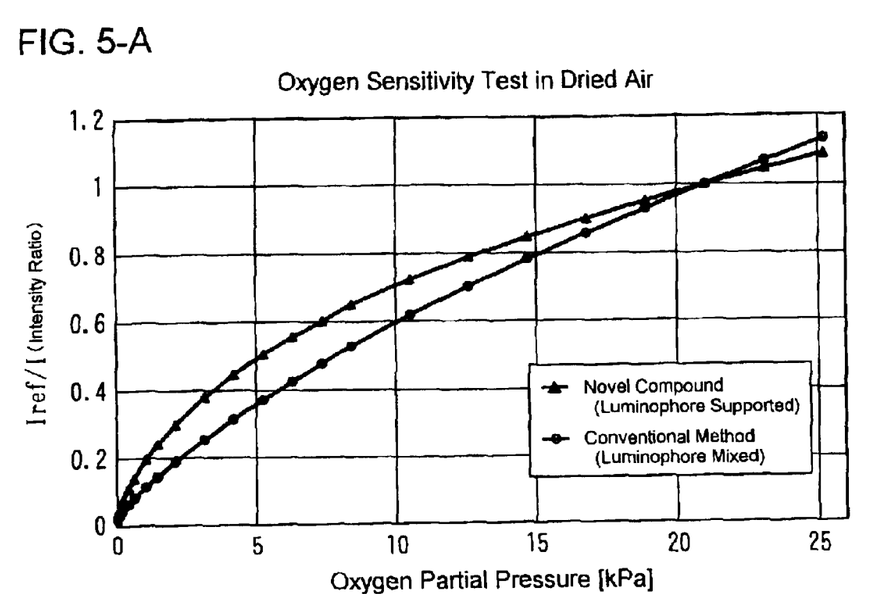
FIG. 5 is a graph depicting the manner in which the emission intensity of a thin film containing the novel compound obtained in accordance with the present invention varies with the oxygen partial pressure.

FIG. 5 shows the results obtained when a thin film obtained as described above was introduced into a container in which the pressure of the contained test gas could be varied, and variations of emission intensity in relation to the oxygen partial pressure were measured. Specifically, the aforementioned thin film allows oxygen partial pressure, which can be converted to air pressure, to be sensed as emission intensity. FIG. 5-A is a graphical representation of results obtained when dried air was used as the test gas, and FIG. 5-B is a graphical representation of test results obtained using a standard gas containing 1000 ppm of oxygen, with nitrogen as the base. The tests were conducted at normal temperature, and the pressure of the test gas was varied from a vacuum to the atmospheric pressure. The horizontal axis in the figure shows the partial pressure of oxygen in the test gas, and the vertical axis shows the reciprocal of the emission intensity (intensity ratio) based on the value for the atmospheric pressure. The figure also depicts the characteristics of a thin film obtained by the conventional method of mixing a luminophore and a binder. Although the data obtained using dried air reveals some disparities, the novel compound is only minimally affected by the retention of the luminophore in the polymer.

Synthesis Example 3

Reacting aminopyrene instead of the pyrrole and benzaldehyde in synthesis process (3) in FIG. 2 yields 4-trimethylsilylethylene benzylidene iminopyrene, and pyrene or another oxygen-quenching luminophore can be supported if this compound is subjected to copolymerization.

Figure 6:
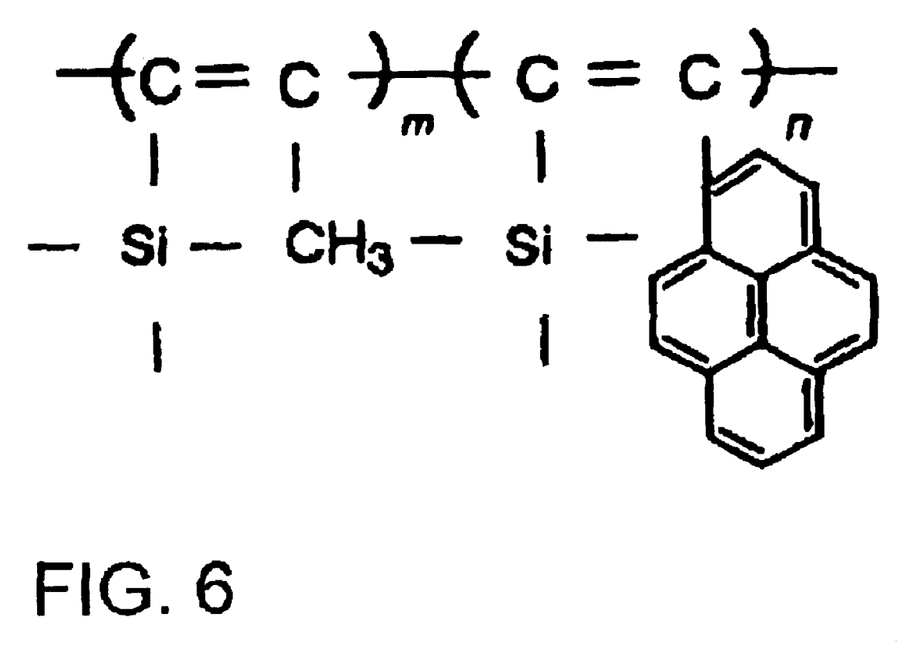
FIG. 6 depicts the structural formula of another novel substance according to the present invention.
Figure 7:
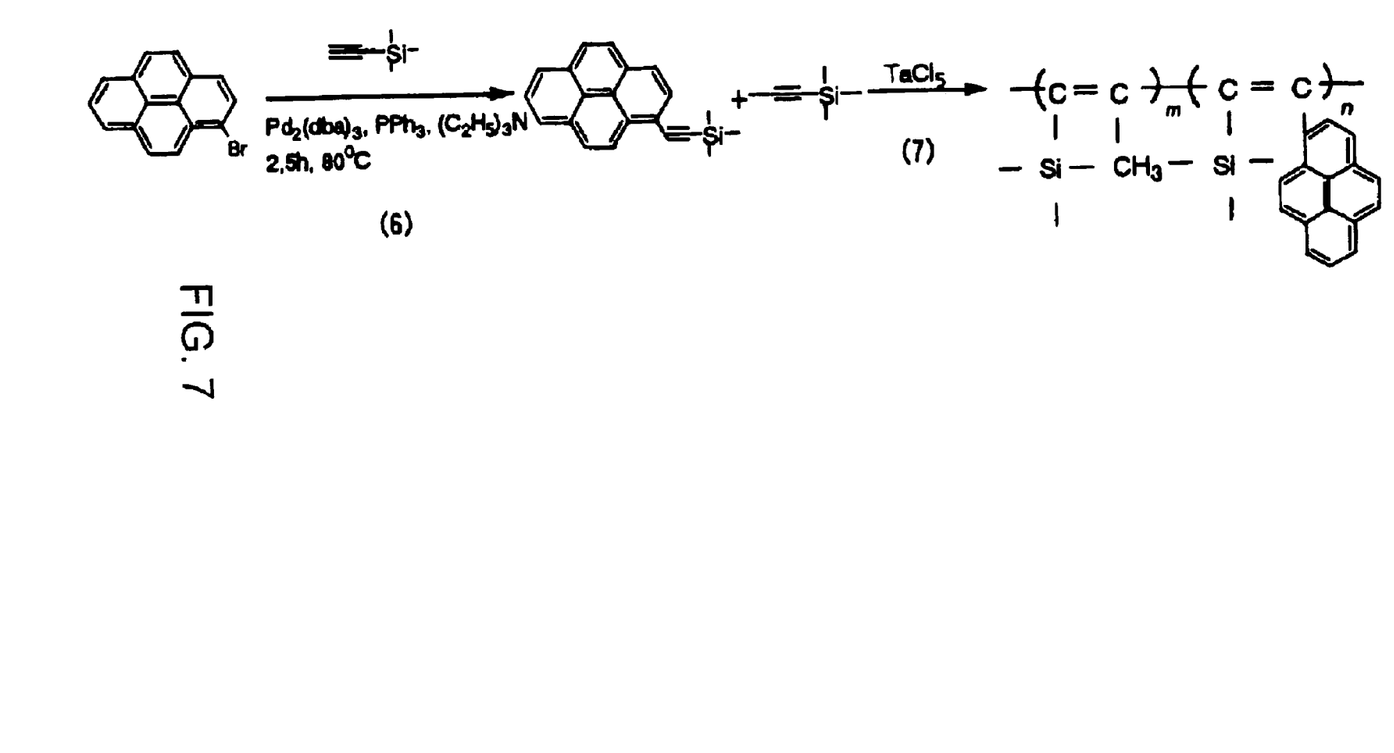
FIG. 7 is a diagram depicting the synthesis path of reactions (6) and (7) for the compound shown in FIG. 6.

Poly(1-trimethylsilylpropyne-co-trimethylsilylethynylpyrene) was synthesized in accordance with reactions in FIG. 7, to give a new high-molecular-weight pyrene polymer in FIG. 6. 4-(Trimethylsilyl) ethynylpyrene was prepared by the coupling reaction (6) of 4-bromopyrene with trimethylsilylacetylene in FIG. 7.

A deaerated solution of 2.0 g of 4-bromopyrene and 0.08 g of triphenylphosphine in 25 mL of anhydrous triethylamine was mixed with 2.3 mL of trimethylsilylacetylene and then 0.07 g of palladium(II) acetate was added under nitrogen. The mixture was heated at 85° C. for 2.5 hours. After cooling down, the solvent was removed under a reduced pressure. The residue was purified by the column chromatography by using silica gel with hexane and dichloromethane as an eluent. The product was obtained by a freeze-drying to give the pyrene monomer as a yellow powder. The yield was 70%. The characterization is shown in Table 2. Trimethylsilylpropyne was selected as the comonomer because of good membrane-forming ability and high gas permeability of its polymer.

4-(Trimethylsilyl)ethynylpyrene was copolymerized with trimethylsilylpropyne with a tantalum chloride catalyst in accordance with reaction (7) in FIG. 7. 0.04 g of tantalum chloride was mixed with 3.3 mL of toluene and 0.7 mL of trimethylsilylpropyne at 90° C. under nitrogen. Then, 0.5 g of 4-(Trimethylsilyl)ethynylpyrene was added under nitrogen. The mixture was heated at 90° C. for 24 hours. After cooling down, the solvent was removed under a reduced pressure with 100° C. The residue was dissolved in a small amount of toluene and poured into methanol for the precipitates. Then, it was filtrated with washing with methanol. Then, it was dried under a reduced pressure to give a brown polymer. The yield was 8.2%. The copolymerization is shown in Table1 and the characterization is shown in Table 2.

TABLE 1

| | | Copolymerization | | |
|---|---|---|---|---|
| [TMSP]/[Pyr] Feed Molar | Yield (%) | Mw $10^3$ | Pyrene Content (mol %) | [Pyr residue]/ [One Polymer Chain] |
| 3/1 | 8.2 | 17 | 10.4 | 12 |

TABLE 2

| | Characterization |
|---|---|
| NMR | 0.11–0.18(s, TMS, 9H) 1.50(s, Me, 3H) 8.23(s, Pyrene) |
| UV-vis | 346, 330(nm) |
| Mass spectrum | 298 (calcd 298) |

What is claimed is:

1. A functional polymer with a supported pressure-sensitive luminophore, comprising an acetylene derivative in which trimethylsilyl groups are bonded and a pressure-sensitive luminophore having oxygen quenching properties is also covalently bonded.

2. The functional polymer with a supported pressure-sensitive luminophore according to claim 1, wherein trimethyl-1-silyl propyne is copolymerized with the acetylene derivative.

3. The functional polymer with a supported pressure-sensitive luminophore according to claim 1, wherein the acetylene derivative is 5-(4-trimethylsilyl ethynyl phenyl)-10,15,20-triphenyl platinum porphyrin.

4. The functional polymer with a supported pressure-sensitive luminophore according to claim 1, wherein trimethyl-1-silyl propyne is copolymerized with the acetylene derivative; and the acetylene derivative is 5-(4-trimethylsilyl ethynyl phenyl)-10,15,20-triphenyl platinum porphyrin.

5. The functional polymer with a supported pressure-sensitive luminophore according to claim 1, wherein the acetylene derivative is trimethylsilylethynylpyrene.

6. A pressure-sensitive paint, obtained by admixing a functional polymer having a supported pressure-sensitive luminophore into a solvent, wherein the functional polymer contains an acetylene derivative in which trimethylsilyl groups are bonded and in which a pressure-sensitive luminophore having oxygen quenching properties is also covalently bonded.

7. The pressure-sensitive paint according to claim 6, wherein trimethyl-1-silyl propyne is copolymerized with the acetylene derivative.

8. The pressure-sensitive paint according to claim 6, wherein the acetylene derivative is 5-(4-trimethylsilyl ethynyl phenyl)-10,15,20-triphenyl platinum porphyrin.

9. The pressure-sensitive paint according to claim 6, wherein trimethyl-1-silyl propyne is copolymerized with the acetylene derivative; and the acetylene derivative is 5-(4-trimethylsilyl ethynyl phenyl)-10,15,20-triphenyl platinum porphyrin.

10. The pressure-sensitive paint according to claim 6, wherein the acetylene derivative is trimethylsilylethynylpyrene.

11. A pressure-sensitive element, comprising a substrate and a pressure-sensitive paint applied to the surface of the substrate and solidified, wherein the pressure-sensitive paint is obtained by admixing into a solvent a functional polymer containing an acetylene derivative in which trimethylsilyl groups are bonded and in which a pressure-sensitive luminophore having oxygen quenching properties is also covalently bonded.

* * * * *